United States Patent [19]

Uchino

[11] Patent Number: 4,680,699
[45] Date of Patent: Jul. 14, 1987

[54] TERMINAL CONTROL APPARATUS FOR PARALLEL EXECUTION OF DATA EDITING AND DATA TRANSMISSION/RECEPTION CONTROL

[75] Inventor: Megumi Uchino, Hadano, Japan
[73] Assignee: Hitachi, Ltd., Tokyo, Japan
[21] Appl. No.: 609,833
[22] Filed: May 14, 1984

[30] Foreign Application Priority Data

May 13, 1983 [JP] Japan .................................. 58-83627

[51] Int. Cl.⁴ ................................................ G06F 3/02
[52] U.S. Cl. ........................................ 364/200; 340/63
[58] Field of Search ... 364/200 MS File, 900 MS File; 400/63, 83

[56] References Cited

U.S. PATENT DOCUMENTS

| | | | |
|---|---|---|---|
| 4,193,112 | 3/1980 | Gilbert et al. | 364/200 |
| 4,264,217 | 4/1981 | De Sieno | 400/63 |
| 4,330,845 | 5/1982 | Damerau | 364/900 |
| 4,538,225 | 8/1985 | Bank et al. | 364/200 |

Primary Examiner—Archie E. Williams
Assistant Examiner—Emily Yue Chan
Attorney, Agent, or Firm—Antonelli, Terry & Wands

[57] ABSTRACT

A terminal control apparatus for controlling data transfer between a terminal device and a central processor includes a terminal control unit for editing data and a communication control unit for transmission/reception of data. The terminal control unit and the communication control unit are operable independently of each other to carry out processings in parallel. In data transmission, when the terminal control unit completes the editing of a predetermined amount of data, the communication control unit transmits the edited data in parallel with edit processing of ensuing data by the terminal control unit. In data reception, when the communication control unit receives a predetermined amount of data, the terminal control unit edits the data in parallel with reception processing of ensuing data by the communication control unit.

3 Claims, 10 Drawing Figures

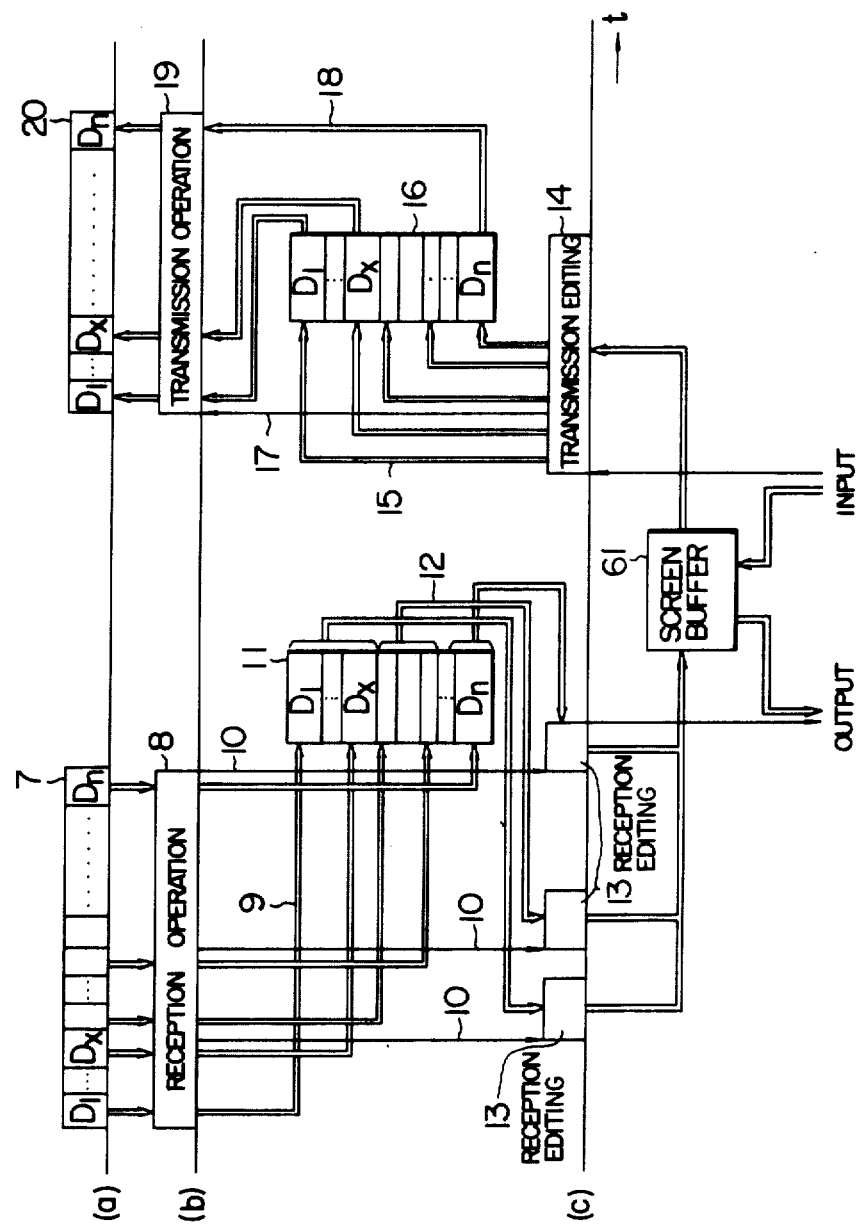

TERMINAL CONTROL APPARATUS FOR PARALLEL EXECUTION OF DATA EDITING AND DATA TRANSMISSION/RECEPTION CONTROL

BACKGROUND OF THE INVENTION

1. Field of the Invention

This invention relates to a terminal control apparatus in a data transfer control system and more particularly to a terminal control apparatus in a data transfer control system for data transmission/reception processing and editing processing of the transmission/reception data.

2. Description of the Prior Art

In an on-line system in which a central electronic computer is coupled to a terminal device, when a text consisting of a transmission control character part STX, a data part, and transmission control character parts ETX and CRC, as shown in FIG. 1a, is transferred from the central electronic computer to a terminal control apparatus, this terminal control apparatus receives the text and converts it into a format suitable for storage in a screen buffer, as shown in FIG. 1b, which is provided for a display device. The converted information is transferred to the terminal device for display or printing. The data part shown in FIG. 1a contains a command, a control byte, a buffer control character, a buffer address and character data. The command includes an erasing command for the entire screen or an input field alone and a command for read/write of data, the control byte includes instructions for actuation or deactuation of a buzzer, unlocking of a keyboard and printing, the buffer control character includes codes for address setting on the screen buffer, designation of an erasing region or a continuous write-in region, and switching of characters, and the character data includes data to be displayed or printed. For example, let us assume data including a command for data write, and instructions for writing "ABC" into an area beginning from an address ADR1, writing "123" into another area beginning from an address ADR2 and writing "*" into addresses between addresses ADR3 and ADR4. Then, when such data is transferred after erasing the entire screen, a picture as shown in FIG. 2 is displayed.

One method for data transfer between a conventional terminal control apparatus and a central electronic computer is called a program input/output method (hereinafter referred to as PIO method). According to the PIO method, the terminal control apparatus without a buffer memory for storage of the entire reception data performs conversion processing specified for the terminal device, such as code conversion and address conversion, and transfers the converted data to the terminal device each time one byte of the reception data is received; or the terminal control apparatus transmits transmission data each time one byte thereof is established, while subjecting the transmission data inputted from the display device, for example, to the data conversion processing, such as the code conversion and address conversion required for data transmission. The PIO method, however, requires that the terminal control apparatus must complete or end editing operations within a period prescribed by the transmission rate of the communication line. Therefore, if the processing operation of the terminal control apparatus is retarded with respect to the transmission rate and transmission timing, a problem arises. More specifically, unless an editing operation for received data is ended prior to reception of a succeeding byte, loss of reception data (called "overrun") occurs; and unless the code conversion and the like processing of a succeeding byte are ended during the present transmission of one byte, a thinning of transmission data (called "underrun") occurs. The above disadvantageous phenomena will take place in other cases than the data transfer between the terminal control apparatus and the central electronic computer. For example, when the terminal device functions to execute an off-line processing for, for example, a hard copy of a data picture displayed on the display device onto the printer or when it is required to execute a sophisticated editing operation, additional time for the off-line processing is required during the transmission/reception of data and the time for the editing operation per se is necessarily prolonged with the result that the editing operation fails to end within the prescribed period with a high probability, causing a serious problem.

Another method for data transfer is called the buffer method herein. According to the buffer method, the data length of transmission/reception data between a terminal control apparatus and a central electronic computer is predetermined by a rule, and a buffer memory for storage of data of a predetermined length is provided in the terminal control apparatus. Data received from the central electronic computer is first stored in the buffer memory and after the data reception has been completed, the data stored in the buffer memory is put together for code conversion and address conversion and is indicated on a terminal device, i.e., displayed on a display device or printed by a printer. In a similar manner, data inputted from the display device, for example, is subjected to data conversion processing, such as code conversion and address conversion, to thereby prepare transmission data to be stored in the buffer memory. After the preparation of the data has been completed, a transmission operation is started to read the transmission data from the buffer memory. Thus, a communication control unit of the terminal control apparatus executes the transmission/reception operation of data while reading or writing the data from or into the buffer memory in a direct memory access (hereinafter referred to as DMA) manner, which is well known in the art.

This buffer method is advantageously applied to a system in which a microprocessor is controlled by programs to ensure that the operation of the microprocessor can be permitted even during the execution of the DMA operation. However, this method disadvantageously degrades the utilization efficiency of the line because the data transmission/reception operation and the data processing operation are executed in different time periods.

FIG. 3 shows a time chart illustrative of the time for data linkage in accordance with the buffer method.

Referring to FIG. 3, where only one text is transmitted from the computer, a selection signal SEL, the text TEXT and an end signal EOT are sequentially transmitted from the computer and the terminal control apparatus returns an acknowledgment signal ACK indicative of correct reception. Since, in the buffer method, the text is first stored in the buffer and thereaft,er the edit processing is carried out, there needs to be provided a text reception time $t_R$ plus an editing time $t_E$. The processing for the conversion of the reception data in the buffer memory and its display or printing, or the processing for assembling pieces of the transmission information in order to prepare the transmission data to be stored in the buffer memory is generally called an edit operation or edit processing.

Assuming that the transmission rate is 9600 BPS, one character has 8 bits and the text length is 1200 bytes, the text reception time $t_R$ and edition time $t_E$ are:

$$t_R = \frac{1}{9600/8} \times 1200 \simeq 1 \text{ (sec.)}$$

and $t_E$ = average text processing time (0.5 ms) × 1200 ≈ 0.6 (sec.).

Thus, when neglecting the time for processing the selection signal SEL and acknowledgement signal ACK as well as the data delay time on the line, it takes 1.6 sec. for processing one reception text. The data link time or line occupation time required for transmission of one text is T as shown in FIG. 3.

FIG. 4 is an operation sequence chart for a prior art terminal control apparatus based on the buffer method.

In FIG. 4, the abscissa represents time and the ordinate represents data positions for the component elements. Data on the communication line is illustrated at section (a) in FIG. 4, data occupying the communication control unit of the terminal control apparatus is illustrated at section (b), and edited data occupying a terminal control unit of the terminal control apparatus is illustrated at section (c). The reception operation proceeds from left to right and, subsequently, the transmission operation is carried out.

When reception data (sequence 7) transmitted from the computer to the terminal device is received by the communication control unit (sequence 8), reception data D1 to Dn is sequentially written into the reception buffer (sequence 11) through the medium of a DMA write operation (sequence 9), the terminal control apparatus reads the data (sequence 12) at the termination of the data write operation, and a processing circuit of the terminal control apparatus performs the reception editing (sequence 13). After completion of the reception editing, the edited data is sent to the terminal device and stored in the screen buffer (sequence 61) for display or printing.

Data inputted from a keyboard, for example, is transferred via the screen buffer (sequence 61) to the terminal control unit and subjected to transmission editing (sequence 14). Thereafter, edited data D1 to Dn is written into the transmission buffer (sequence 16). The data D1 to Dn written in the transmission buffer is sequentially sent to the communication control unit through the medium of a DMA read operation (sequence 18), transmitted as transmission data (sequence 19) onto the line (sequence 20) and transferred to the computer.

As will be seen from FIG. 4, after the completion of the reception operation (sequence 8), a reception interruption (sequence 10) is generated to start the reception editing (sequence 13). Accordingly, the reception operation and the reception editing are carried out in different time zones or in series. Similarly, in the case of transmission, a transmission instruction (sequence 17) is generated after the completion of the transmission editing (sequence 14) to start the transmission operation. Accordingly, the transmission editing and the transmission operation are carried out in different time periods or in series.

SUMMARY OF THE INVENTION

An object of this invention contemplates elimination of the prior art drawbacks described above and has for its object to provide a terminal control apparatus in a data transfer control system capable of preventing the generation of the overrun and the underrun phenomena and which is also capable of improving the utilization efficiency of the line.

According to this invention, a terminal control apparatus on-line coupled to a central electronic computer via a communication line in a data transfer control system has a buffer memory for temporary storage of communication data, and means for discriminating the length of the communication data stored in the buffer memory. While receiving the communication data, the terminal control apparatus edits the communication data according to the length which has been received so far or while preparing the communication data, the terminal control apparatus transmits communication data of a length which has been prepared so far. In this manner, the terminal control apparatus assures parallel execution of the transmission/reception operation and the editing operation.

BRIEF DESCRIPTION OF THE DRAWINGS

FIG. 8 shows details of operation sequence in the terminal control apparatus according to the invention.

DESCRIPTION OF THE PREFERRED EMBODIMENT

Figure 5:
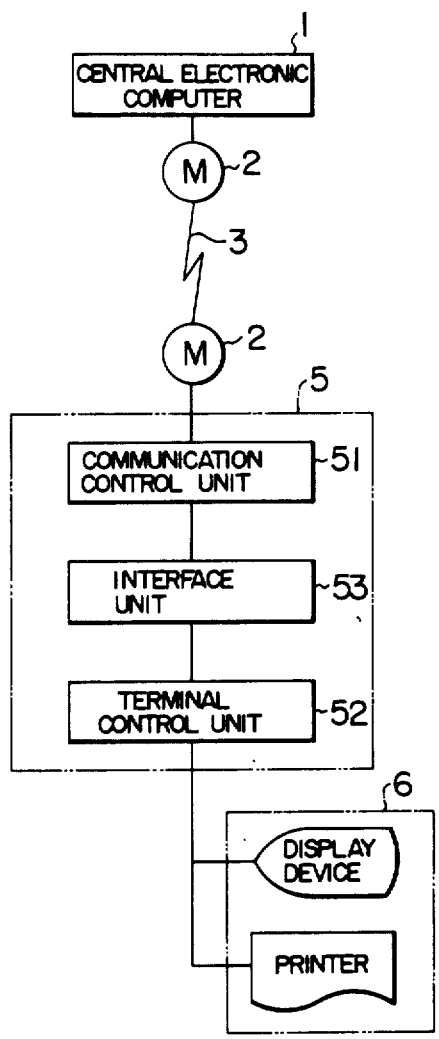
FIG. 5 is a block diagram showing an on-line data transfer system embodying the invention.

FIG. 5 schematically illustrates an on-line data transfer system embodying this invention.

Referring to FIG. 5, a central electronic computer 1 and a terminal control apparatus 5 are coupled together via modems 2 and a communication line 3. The terminal control apparatus 5 is connected to a plurality of input-/output terminal devices 6, such as a display device and a printer. The terminal control apparatus 5 has a communication control unit 51, an interface unit 53 and a terminal control unit 52. The communication control unit 51 and the terminal control unit 52, operable independently of each other, each have a microprogram controller which executes processings in accordance with microprograms and they operate under the control of the microprogram controller. Principal operation is classified into an on-line operation mode and an off-line operation mode. In the on-line operation mode, mostly display data inputted from the input/output terminal device 6 is read by the terminal control unit 52 which causes the read data to undergo edit processings, such as code conversion and address conversion, so that the data is converted into a message format which is predetermined by rule for the central electronic computer 1. The data is sent via the interface unit 53 to the communication control unit 51 that manages a transmission rate and a transmission timing which are predetermined by rule. The data is then transmitted to the central electronic computer 1 via the modems 2 and communication line 3 in accordance with the predetermined transmission rate and timing. The central electronic computer 1 analyzes the input data transmitted from the terminal control apparatus 5 to update files and make reference thereto, and returns a resulting answer data to the input/output terminal device 6. The communication control unit 51 of the teminal control apparatus 5 receives the answer data in accordance with the predetermined transmission rate and timing. The data is then sent via the interface unit 53 to the terminal control unit 52 which edits the data for code conversion and address conversion. The thus edited data is displayed or printed at the input/output terminal device 6. In the off-line operation mode mostly guidances retained in the terminal control unit 52 are displayed on the display device or display pictures on the display device are printed by the printer for local copy.

Figure 6:
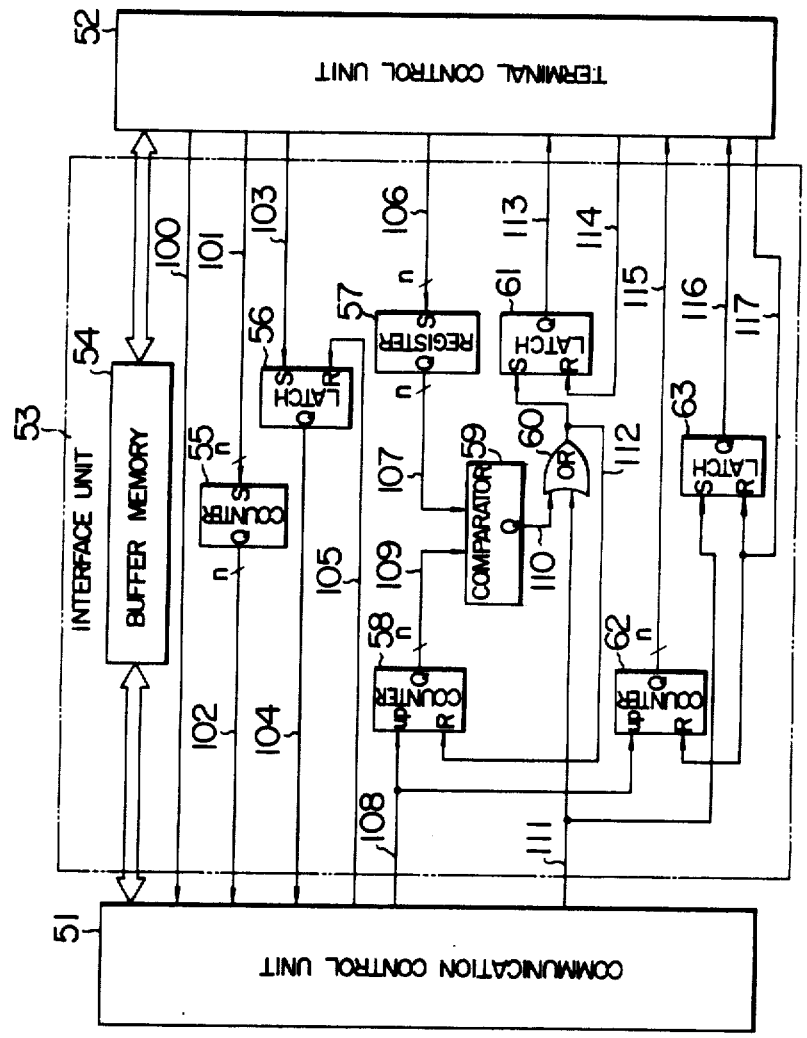
FIG. 6 is a block diagram showing details of an interface unit of a terminal control apparatus embodying the invention.
Figure 7A:
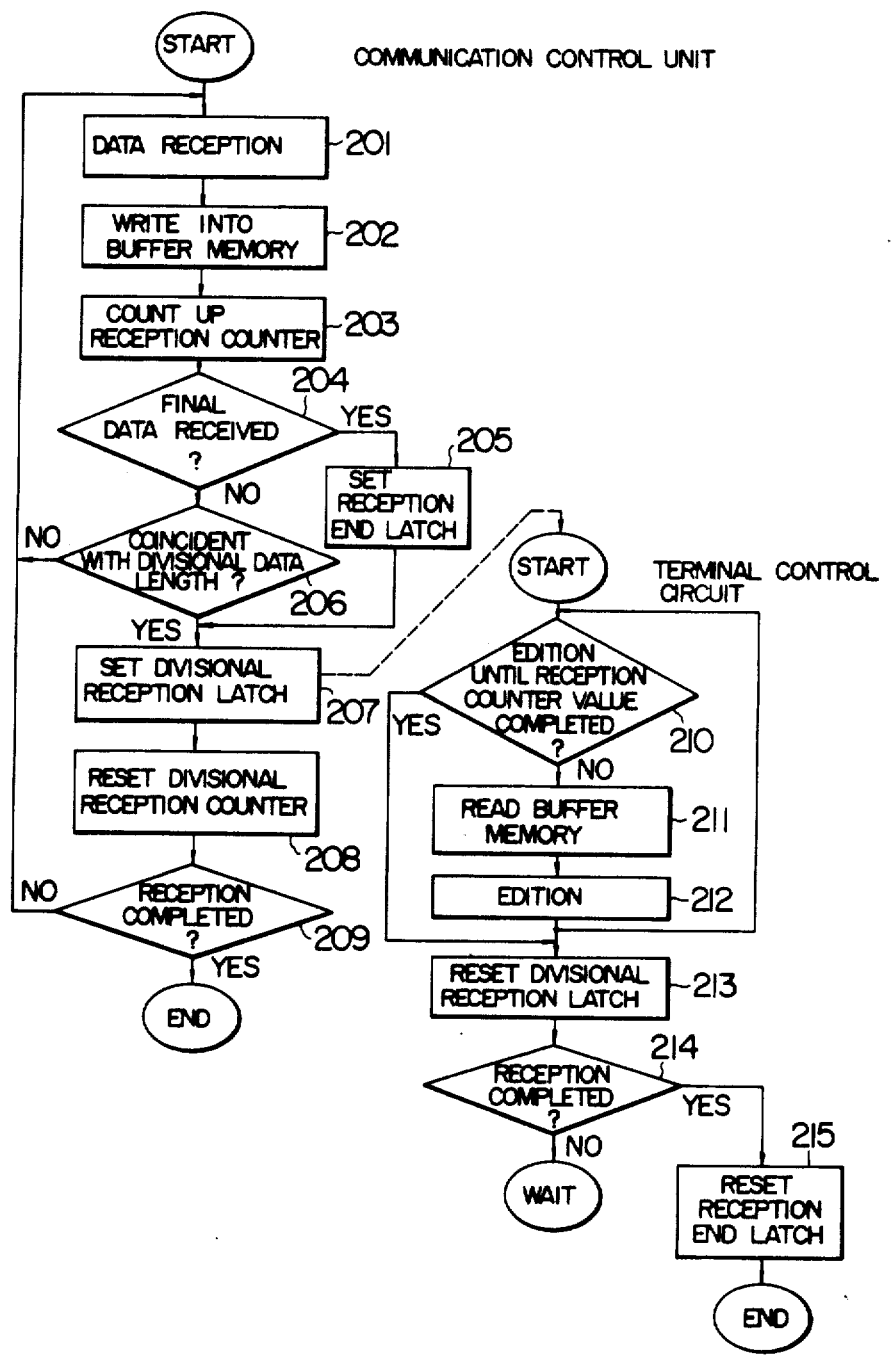
FIG. 7a is a flow chart of processings in a communication control unit and a terminal control unit of the terminal control apparatus upon data reception.
Figure 7B:
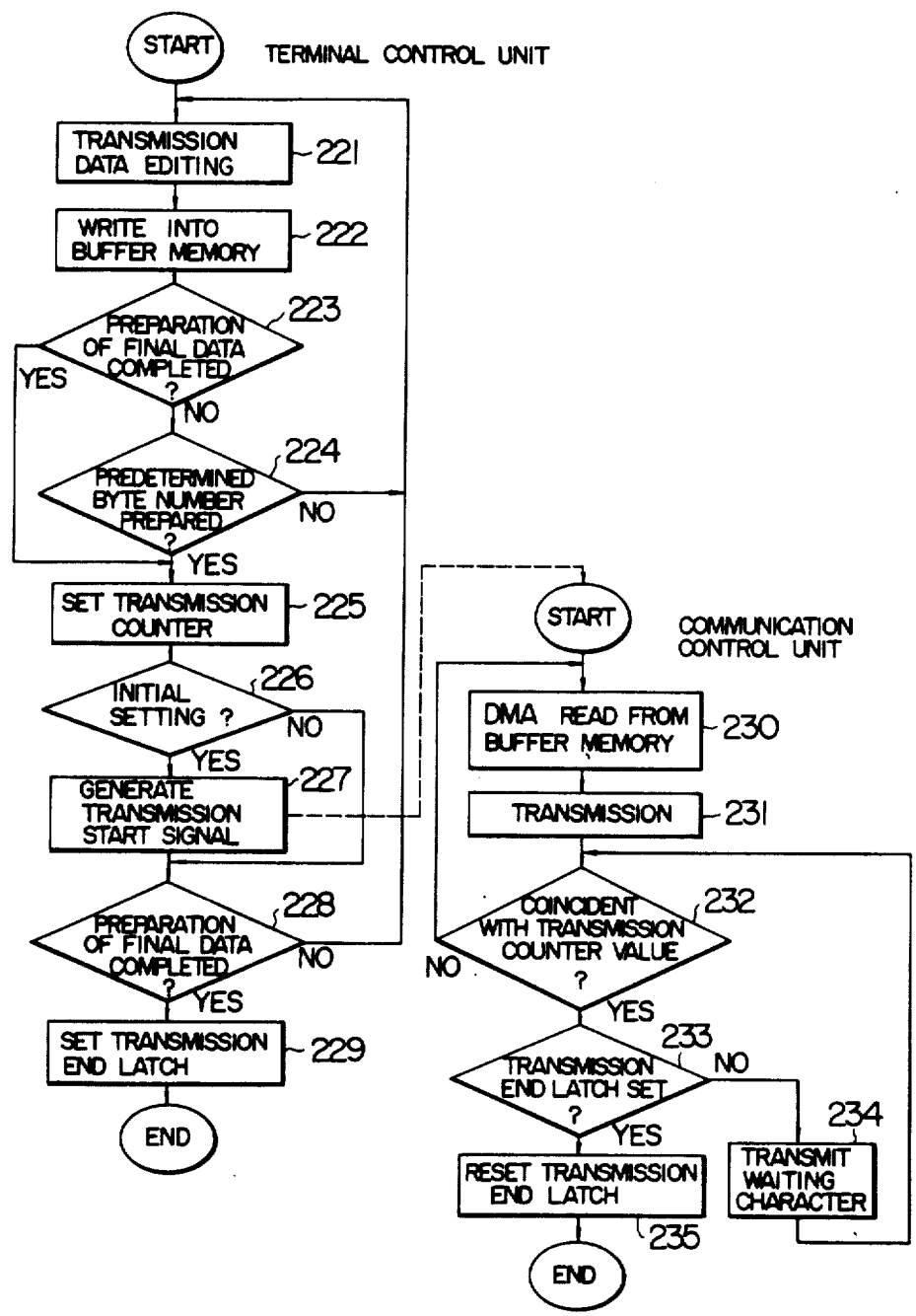
FIG. 7b is a flow chart of processings in the communication control and terminal control units upon data transmission.

FIG. 6 illustrates, in block form, details of the interface unit 53 shown in FIG. 5. FIGS. 7a and 7b are flow charts illustrative of processings in the communication control unit 51 and terminal control unit 52 which are operated under the control of the microprogram controller.

The interface unit 53 comprises a buffer memory 54, a transmission counter 55, a reception counter 62, a divisional reception counter 58, a transmission ending latch 56, a reception ending latch 63, a divisional reception latch 61, and a comparator 59. FIG. 7a is for reception operation and FIG. 7b is for transmission operation.

The terminal control unit 52 edits (step 221) data supplied from the input/output terminal device 6 and writes it into the buffer memory 54 (step 222). Concurrently, a transmission data length setting signal 101 is generated each time that a predetermined number of bytes, for example, 16 bytes are written and it is applied to the transmission counter 55 so as to set a predetermined transmission data length (steps 223 to 225).

When the transmission data length is set initially, a transmission start signal 100 is generated by which the communication control unit 51 is informed of the transmission start (steps 226 and 227) and prepares transmission data. Upon completion of the preparation of the transmission data, a transmission data length of the entire transmission data is set and at the same time, a transmission end setting signal 103 is generated which sets the transmission ending latch 56 (steps 228 and 229).

On the other hand, when the communication control unit 51 detects the transmission start signal 100, it reads the transmission data from the buffer memory 54 in the DMA fashion (step 230). While reading the data, the communication control unit 51 transmits the thus read data at timings in accordance with the transmission rate until the length of the transmission data coincides with a transmission data length signal 102 set in the transmission counter 55 (steps 231 and 232). If the transmission counter 55 is initially set with "16", then 16 bytes are read and transmitted.

When the transmission reaches coincidence with the tranmsission data length signal 102, the transmission operation terminates if a transmission ending signal 104 is set in the transmission ending latch 56, and a transmission ending reset signal 105 resets the transmission ending latch 56 and the communication control unit 51 awaits a next transmission start signal 100 (steps 233 to 235).

If the transmission ending signal 104 is not set, the communication control unit 51 awaits updating of the transmission data length signal 102 to a next value, while transmitting a waiting character and upon completion of the updating, the unit 51 restarts the DMA read operation for the buffer memory 54 (steps 232 to 234).

In summary, when the transmission counter 55 is initially set to "16" and 16 bytes are transmitted as described above, the communication control unit 51 is brought into a waiting state (step 234) upon coincidence of the transmission data number with the contents of the transmission counter 55. If the next 16 bytes are edited by the terminal control unit 52 and set into the buffer memory 54, the transmission counter 55 is incremented by "16" by the signal 101 to indicate "32". Then, the value (32 bytes) of the transmission counter 55 deviates from coincidence with the transmission data number (16 bytes). Therefore, the transmission of the next 16 bytes is again executed through steps 230 and 231. Similarly, the transmission is carried out each time that the 16 bytes are edited by the terminal control unit 52 and stored in the buffer memory 54, and repeated until a final data is transmitted.

The predetermined byte number has been described as 16 bytes for illustration only and any number of bytes may be used.

As described above, according to the present invention, the communication control unit 51 can transmit the transmission data in the same time period as that for the terminal control unit 52 to prepare the transmission data.

Now, the reception processing will be described.

A divisional counter 57 has been set, in advance, with a divisional data length (16 bytes) by a signal 106 from the terminal control unit 52.

While DMA writing the reception data received at timings in accordance with the transmission rate into the buffer memory 54, the communication control unit 51 sends a reception count-up signal 108 which increments the divisional reception counter 58 and reception counter 62 (steps 201 to 203). Upon completion of DMA write operation for the final reception data, a reception ending signal 111 is issued to set the reception ending latch 63 (step 205).

A divisional data length signal 107 of the divisional counter 57 and a divisional reception data length signal 109 of the divisional reception counter 58 are constantly compared with each other (step 206). Upon coincidence, a coincidence signal 110 generates a divisional reception set signal 112 which sets the divisional reception latch 61 (step 207). The reception ending set signal 111 also generates the divisional reception set signal 112 and the divisional reception counter 58 is reset thereby (step 208).

Thus, in this embodiment, the coincidence signal 110 is generated each time that the communication control unit 51 receives data having the same byte number as the data length (16 bytes) set in the divisional counter 57. The divisional reception counter 58 is sequentially incremented from "0" until it returns to "0" when "16" is reached to generate the coincidence signal 110.

When detecting that the divisional reception latch 61 is set and a divisional reception signal 113 is generated, the terminal control unit 52 reads a reception data in the buffer memory 54 having a data length which is indicated by a reception data length signal 115 of the reception counter 62 and edits the thus read data for address conversion and the like (steps 210 to 212). Thereafter, a divisional reception reset signal 114 resets the divisional reception latch 61. When the reception end latch 63 is not set to generate a reception end signal 116, the terminal control unit 52 awaits the generation of a next divisional reception signal 113 and repeats its operation through steps 213 and 214. As in the transmission operation, the above processing is repeated each time the data of 16 bytes, for example, is set in the buffer memory 54. When the reception end signal 116 is set, a reception and reset signal 117 resets the reception counter 62 and reception end latch 63, and the reception editing processing ends (step 215). Through the above operation, the terminal control unit 52 can edit the reception data in the same time period as that for the communication control unit 51 to receive the reception data.

FIG. 8 shows the operation sequence of the terminal control apparatus in accordance with the embodiment described above.

Figure 4:
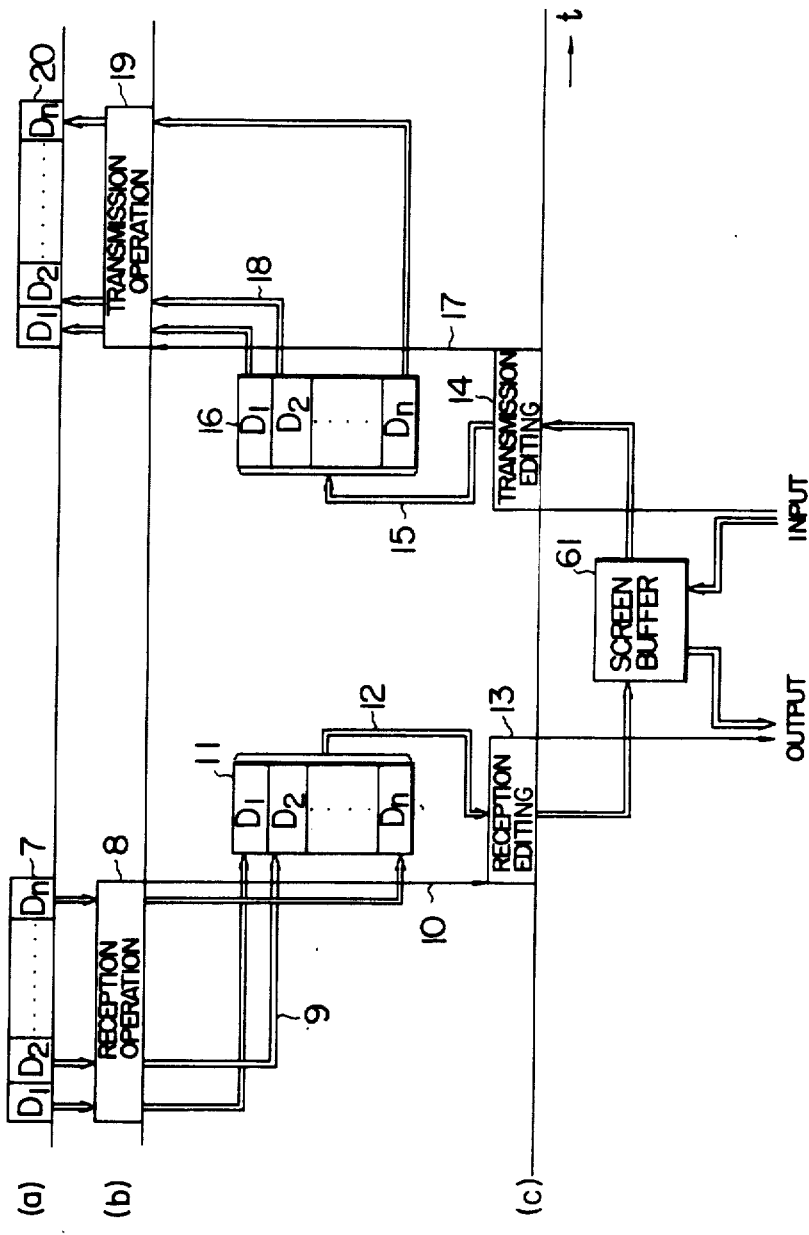
FIG. 4 shows details of operation sequence in accordance with the prior art data transfer method.

In FIG. 8, which is similar to FIG. 4, the abscissa represents time and the ordinate represents data positions on component elements. Data on the communication line is illustrated at section (a) in FIG. 8, data occupying the communication control unit is illustrated at section (b), and edit data occupying the terminal control unit is illustrated at section (c).

When reception data (sequence 7) transmitted from the computer to the terminal device is received by the communication control unit (sequence 8), reception data Dl to Dn is sequentially written into the reception buffer (sequence 11) through the medium of a DMA write operation (sequence 9). The FIG. 8 operation sequence is different from the FIG. 4 sequence in that a reception interruption (sequence 10) is generated each time data of a data length predetermined in the reception operation (sequence 8) is received, so that divisional data is read out of the reception buffer (sequence 11) several times and edited (sequence 13). In addition, upon each completion of editing of the divisional data the edited data is sent to the screen buffer 61 of the terminal device and, therefore, the period between the data reception and the display or printing of the data can be reduced.

On the other hand, data inputted from the keyboard is transferred to the terminal control unit via the buffer (sequence 61) and subjected to transmission editing (sequence 14). But, unlike the FIG. 4 operation sequence, the transmission instruction (sequence 17) is sent at a time when the editing of the predetermined data length is completed, thereby reducing the period preceding the transmission start. Then, upon each completion of the editing of the divisional data length, the edited divisional data is written into the transmission buffer (sequence 16) and data Dl to Dn is sequentially read through the medium of a DMA read operation (sequence 18) to be sent to the communication control unit which in turn completes the transmission operation (sequence 19). As will be seen from FIG. 8, in the case of reception, the reception editing is executed stepwise in mid course of the reception operation and, consequently, the reception operation and the reception editing can be executed in substantially the same time period. Similarly, in the case of transmission, the transmission instruction is generated in mid course of the transmission editing and, as a result, the ensuing transmission editing and the transmission operation can be executed in the same time period. In this manner, both the times for reception editing and transmission editing can be reduced.

Figures 1A, 1B:
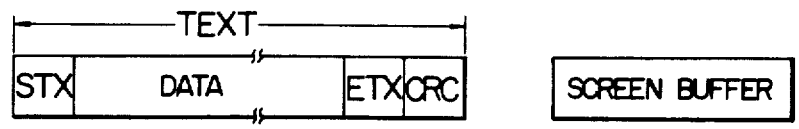
FIG. 1a shows a format of a text.
FIG. 1b shows a screen buffer.
Figure 2:
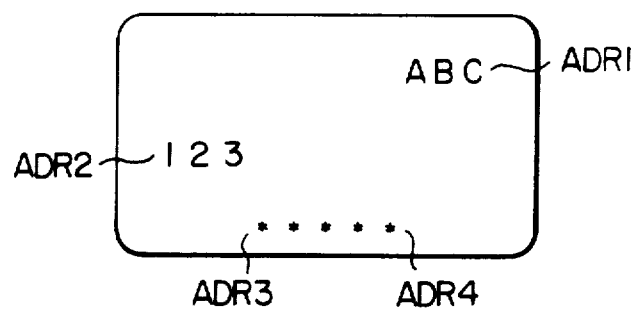
FIG. 2 shows one example of picture display on a display device.
Figure 3:
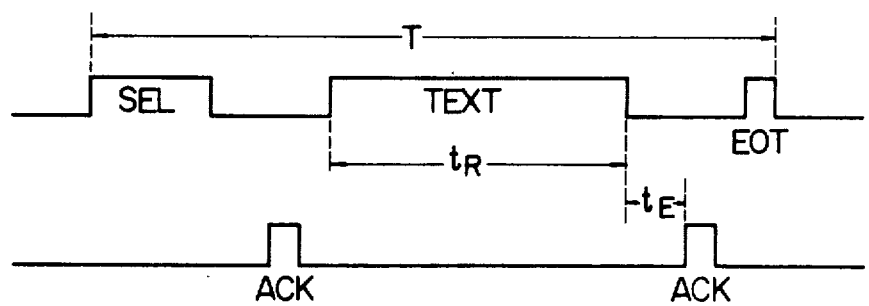
FIG. 3 is a time chart for explaining a prior art data transfer method.

To explain the time reduction, reference should be made to FIG. 3. While the conventional buffer method requires 1.6 sec. which is the sum of reception time $t_R$ and edition time $t_E$ for processing the reception of one text, the transfer control of the present, invention, in which the reception time, $t_R$ covers the editing time $t_E$, 1.0 sec. can suffice for the entire processing upon reception of one text, under the same conditions as in the preceding assumption that the transmission rate is 9600 BPS, the bit number per one character is 8 bits and the text length is 1200 bytes. Strictly speaking, when the divisional processing data length is set to be 10 bytes with the editing processing time $t_E$ measuring a maximum of 5 ms, the entire processing time $(t_R+t_E)$ amounts to 1.005 sec. In this case, the efficiency is $1.6/1.005 \times 100(\%) \approx 160(\%)$.

The interface unit 53 has been implemented by hardware in the foregoing embodiment. Alternatively, a memory to which the terminal control unit and communication control unit can make reference in common may be provided, so that these units can interchange necessary information through the memory.

As has been described, according to the present invention, the transmission/reception operation can be performed in parallel with the editing operation to reduce the entire time for processing the transmission/reception operation, thereby improving the utilization efficiency of the communication line. Further, since the period between data reception and display of the data on the terminal screen and the period between data inputting and data transmission can be reduced, not only performance of the apparatus per se can be improved but also the generation of overrun and underrun, i.e., defective phenomena inherent to the PIO method can be prevented efficiently.

I claim:

1. A terminal control apparatus for controlling data transfer between a terminal device and a central processor comprising:
   buffer memory means;
   terminal control means connected to said terminal device for controlling transfer of data to and from said terminal device and editing of said data, including first means for editing first data received from said terminal device into a format for transfer to said central processor and for storing the edited first data into said buffer memory means, and second means for reading out from said buffer memory means a predetermined amount of second data to be transferred from said central processor to said terminal device, for editing it into a format suitable for transfer to said terminal device, and for transferring the predetermined amount of the edited second data to said terminal device;
   communication control means connected to said central processor for controlling transfer of data to and from said central processor, including third means for reading out from said buffer memory means a predetermined amount of the edited first data which has been stored therein by said terminal control means and for transferring the predetermined amount of the edited first data to said central processor, and fourth means for writing the second data to be transferred from said central processor to said terminal device into said buffer memory means; and interface control means connected between said terminal control means and said communication control means for controlling said communication control means to read out the predetermined amount of the edited first data from said buffer memory means and transfer it to said central processor each time said terminal control means has written said predetermined amount of the edited first data into said buffer memory means and at the same time said terminal control means is writing a further predetermined amount of edited first data into said buffer memory means, and controlling said terminal control means to read out from said terminal device said predetermined amount of the second data from said buffer memory means and transfer the predetermined amount of the edited second data to said terminal device each time said communication control means has written the predetermined amount of the second data into said buffer memory means and at the same time said communication control means is writing a further predetermined amount of the second data into said buffer memory means.

2. A terminal control apparatus according to claim 1, wherein said interface control means includes a counter and said first means includes means connected to said counter for increasing the content of said counter by said predetermined amount each time said terminal control means has written said predetermined amount of the edited first data into said buffer memory means, and said third means includes means connected to receive the content of said counter for reading out from said buffer memory means the edited first data until the amount of the edited first data read out coincides with the content of said counter.

3. A terminal control apparatus according to claim 1, wherein said interface control means includes detecting means connected to said communication control means for detecting that the second data received by said buffer memory means from said communication control means has reached said predetermined amount, and in response to a detection signal from said detecting means, said terminal control means reads out from said buffer memory means the second data, and thereafter edits it.

* * * * *